United States Patent
Wang et al.

(10) Patent No.: US 11,451,691 B2
(45) Date of Patent: Sep. 20, 2022

(54) DRIVING MECHANISM, CAMERA MODULE AND ELECTRONIC DEVICE

(71) Applicant: Beijing Xiaomi Mobile Software Co., Ltd., Beijing (CN)

(72) Inventors: Hui Wang, Beijing (CN); Zhidong Yin, Beijing (CN); Yan Zheng, Beijing (CN); Zongbao Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/554,232

(22) Filed: Aug. 28, 2019

(65) Prior Publication Data

US 2020/0162650 A1 May 21, 2020

(30) Foreign Application Priority Data

Nov. 21, 2018 (CN) .......................... 201811390590.8

(51) Int. Cl.
*H04N 5/225* (2006.01)
*H04N 5/232* (2006.01)

(52) U.S. Cl.
CPC ......... *H04N 5/2253* (2013.01); *H04N 5/2252* (2013.01); *H04N 5/2254* (2013.01); *H04N 5/2259* (2013.01); *H04N 5/23212* (2013.01)

(58) Field of Classification Search
CPC .. H04N 5/2253; H04N 5/2252; H04N 5/2254; H04N 5/2259; H04N 5/23212
See application file for complete search history.

(56) References Cited

U.S. PATENT DOCUMENTS 9,706,092 B1 * 7/2017 Tam ..................... H04N 5/2254
9,897,895 B2 2/2018 Zhao et al.
(Continued)

FOREIGN PATENT DOCUMENTS

CN 2849971 Y 12/2006
CN 101064779 A 10/2007
(Continued)

OTHER PUBLICATIONS

International Search Report for International Application No. PCT/CN2019/091170, dated Sep. 11, 2019.
(Continued)

*Primary Examiner* — Jason A Flohre
(74) *Attorney, Agent, or Firm* — Finnegan, Henderson, Farabow, Garrett & Dunner, L.L.P.

(57) ABSTRACT

Disclosed herein are a driving mechanism, a camera module and an electronic device. The driving mechanism includes: a driving component, a movable assembly, and a fixed assembly, wherein the driving component includes an elastic conductor element, a closed circuit, and a magnetic element; wherein the closed circuit is located in a magnetic field generated by the magnetic element, and is configured to communicate with the elastic conductor element to generate an electromagnetic force for overcoming an elastic force of the elastic conductor element; and wherein the elastic conductor element is fixedly connected with the fixed assembly, and is abutted against the movable assembly; and the elastic conductor element is configured to drive the movable assembly to move relative to the fixed assembly during a focusing function in response to determining that the electromagnetic force is greater than the elastic force of the elastic conductor element.

12 Claims, 7 Drawing Sheets

(56) References Cited

U.S. PATENT DOCUMENTS

| | | | |
|---|---|---|---|
| 2008/0062301 A1* | 3/2008 | Zhou | H04N 5/23212 |
| | | | 348/345 |
| 2009/0045896 A1 | 2/2009 | Wang et al. | |
| 2009/0109318 A1* | 4/2009 | Chang | H04N 5/2257 |
| | | | 348/340 |
| 2010/0246035 A1 | 9/2010 | Yamashita et al. | |
| 2014/0327965 A1 | 11/2014 | Chen et al. | |
| 2016/0178922 A1 | 6/2016 | Hu et al. | |
| 2016/0195794 A1* | 7/2016 | Zhao | H04N 5/23241 |
| | | | 348/335 |
| 2016/0205304 A1* | 7/2016 | Oh | H04N 5/2254 |
| | | | 348/374 |
| 2016/0341927 A1 | 11/2016 | Chen et al. | |
| 2017/0155816 A1* | 6/2017 | Ito | H04N 5/2328 |
| 2017/0180619 A1* | 6/2017 | Ba-Tis | H01L 27/14625 |
| 2017/0289457 A1 | 10/2017 | Hu et al. | |
| 2017/0293105 A1 | 10/2017 | Hu et al. | |
| 2018/0003921 A1 | 1/2018 | Chen et al. | |
| 2018/0124296 A1 | 5/2018 | Mak et al. | |
| 2018/0234595 A1* | 8/2018 | Lim | H04N 5/2251 |
| 2018/0316847 A1* | 11/2018 | Lau | H04N 5/23248 |
| 2019/0020822 A1* | 1/2019 | Sharma | H02K 41/0356 |
| 2019/0086641 A1 | 3/2019 | Chen et al. | |
| 2021/0080807 A1* | 3/2021 | Sharma | G03B 3/04 |

FOREIGN PATENT DOCUMENTS

| | | |
|---|---|---|
| CN | 103501402 A | 1/2014 |
| CN | 105022204 A | 11/2015 |
| CN | 204903924 U | 12/2015 |
| CN | 107277307 A | 10/2017 |
| EP | 1 884 828 A1 | 2/2008 |
| JP | 2003-121725 A | 4/2003 |
| JP | 2004029668 A | 1/2004 |
| JP | 2012-103555 A | 5/2012 |
| JP | 5304896 B2 | 10/2013 |
| JP | 2014-66935 A | 4/2014 |
| JP | 2017-107190 A | 6/2017 |
| JP | 6311434 B2 | 4/2018 |
| KR | 20080020662 A | 3/2008 |
| KR | 20110070385 A | 6/2011 |
| KR | 101262878 B1 | 5/2013 |
| KR | 10-2017-0036346 A | 4/2017 |
| RU | 2627998 C2 | 8/2017 |
| WO | WO 2006/085714 A1 | 8/2006 |
| WO | WO 2007/069844 A1 | 6/2007 |
| WO | WO 2012/005456 A2 | 1/2012 |
| WO | WO 2017080526 A1 | 5/2017 |

OTHER PUBLICATIONS

Written Opinion of the International Search Authority for International Application No. PCT/CN2019/091170, dated Sep. 11, 2019.
First Office Action of Russian Application No. 2019130128, dated Apr. 16, 2020.
Extended European Search Report for European Application No. 19200419.0, dated Apr. 14, 2020.
Notification of Reason for Refusal for corresponding Korean Application No. 10-2019-7029180 dated Nov. 26, 2020.
Notice of Reasons for Refusal dated Mar. 15, 2021, from Japanese Patent Office in counterpart Japanese Application No. 2019-552984.
Office Action dated Apr. 16, 2021, from European Patent Office in counterpart European Application No. 19200419.0.
Notification of Reason for Refusal dated May 18, 2021, from Korean Patent Office in counterpart Korean Application No. 10-2019-7029780.
Notice of Reasons for Refusal dated Nov. 24, 2021, from the Japanese Patent Office issued in counterpart Japanese Application No. 2019-552984.
Notice of Allowance dated Nov. 17, 2021, from the Korean Intellectual Property Office issued in counterpart Korean Application No. 10-2019-7029180.
Decision of Refusal of Japanese Application No. 2019-552984, dated Apr. 4, 2022.

* cited by examiner

DRIVING MECHANISM, CAMERA MODULE AND ELECTRONIC DEVICE

CROSS-REFERENCE TO RELATED APPLICATIONS

This application is based upon and claims priority to Chinese Patent Application No. 201811390590.8, filed on Nov. 21, 2018, the entire contents of which are incorporated herein by reference.

TECHNICAL FIELD

The present disclosure relates to the technical field of electronics, and more particularly, to a driving mechanism, a camera module and an electronic device.

BACKGROUND

In the related art, a camera of an electronic device, such as a mobile phone, is generally divided into a fixed focus camera and an auto focus camera. For the fixed focus camera, since a distance between a lens of the fixed focus camera and a photosensitive chip/light-sensitive component is fixed, only the fixed-focus photographing can be implemented, and it may be difficult for the photographing effect to meet user requirements. For the auto focus camera, a drive motor makes a lens move relative to a fixed photosensitive chip.

However, while the performance of the camera is improved, the thickness, size and weight of the lens are also increased. In order to meet requirements on a driving force, the corresponding drive motor is also increasingly larger and thus the overall thickness, size and weight of the camera and the electronic device are increased.

Therefore, there is a need to improve the lightness and thinness of the camera while maintaining the auto focus/automatic focusing function and photographing quality of the camera.

SUMMARY

According to a first aspect of embodiments of the present disclosure, there is provided a driving mechanism, which includes: a driving component, a fixed assembly and a movable assembly. The driving component includes an elastic conductor element, a closed circuit, and a magnetic element. The closed circuit is located in a magnetic field generated by the magnetic element, and is configured to communicate with the elastic conductor element to generate an electromagnetic force for overcoming an elastic force of the elastic conductor element. The elastic conductor element is fixedly connected with the fixed assembly, and is abutted against the movable assembly; and the elastic conductor element is configured to drive the movable assembly to move relative to the fixed assembly during a focusing function in response to determining that the electromagnetic force is greater than the elastic force of the elastic conductor element.

According to a second aspect of embodiments of the present disclosure, there is provided a camera module, which includes: the driving mechanism; a photosensitive chip, assembled on the movable assembly; and a lens component, assembled on the fixed assembly.

According to a third aspect of the present disclosure, there is provided an electronic device, which includes: a device body; and the camera module, wherein the camera module is configured to be assembled on the device body.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
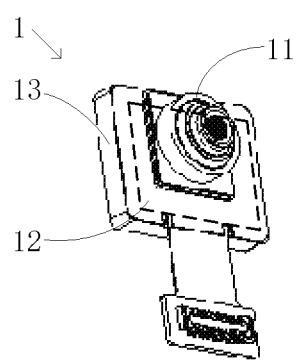
FIG. 1 is a stereoscopic structural schematic diagram illustrating a camera module according to an exemplary embodiment of the present disclosure.
Figure 2:
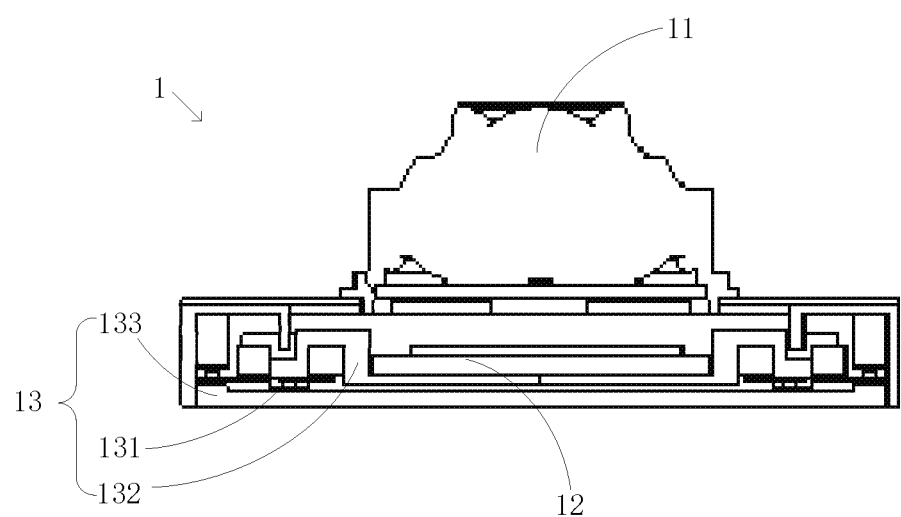
FIG. 2 is a sectional structural schematic diagram illustrating a camera module according to an exemplary embodiment of the present disclosure.

FIG. 1 is a stereoscopic structural schematic diagram illustrating a camera module 1 according to an exemplary embodiment of the present disclosure. FIG. 2 is a sectional structural schematic diagram illustrating the camera module 1 according to an exemplary embodiment of the present disclosure. As illustrated in FIGS. 1 and 2, the camera module 1 includes: a driving mechanism 13, a photosensitive chip 12, and a lens component 11. The driving mechanism 13 includes a driving component 131, a fixed assembly 133 and a movable assembly 132. The photosensitive chip 12 is assembled on the movable assembly 132, and the lens component 11 is assembled on the fixed assembly 133. The driving component 131 is configured to cooperate with the movable assembly 132 to drive the movable assembly 132 to move relative to the fixed assembly 133 during a focusing function.

Figure 3:
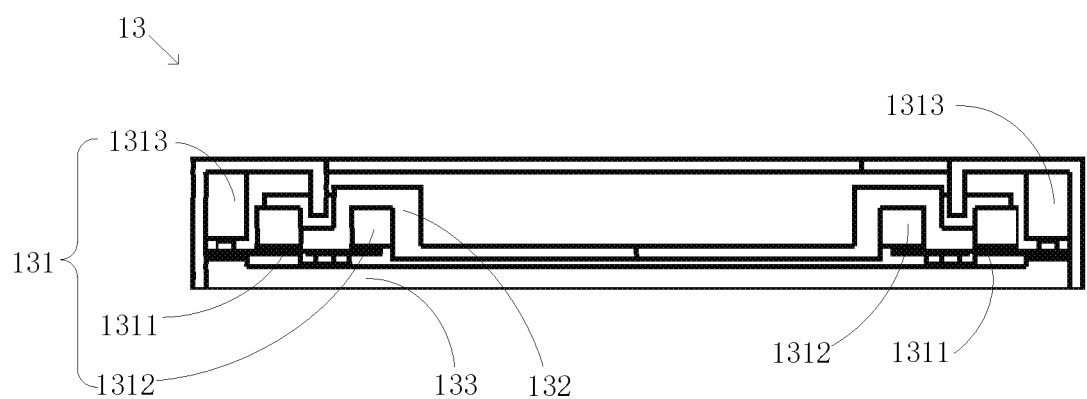
FIG. 3 is a sectional structural schematic diagram illustrating a driving mechanism according to an exemplary embodiment of the present disclosure.
Figure 4:
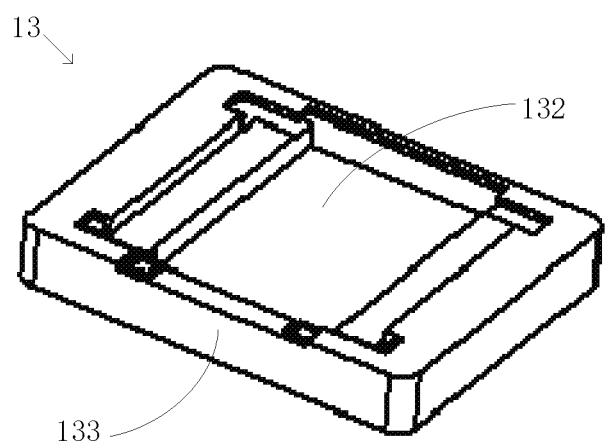
FIG. 4 is a stereoscopic structural schematic diagram illustrating a driving mechanism according to an exemplary embodiment of the present disclosure.

As illustrated in FIGS. 3 and 4, the driving component 131 includes an elastic conductor element 1311, a closed circuit 1312 and a magnetic element 1313. The elastic conductor element 1311 is fixedly connected to the fixed assembly 133, and is supported/pressed/abutted against the movable assembly 132. The magnetic element 1313 can generate a magnetic field perpendicular to a direction of an optical axis of the lens component 11. The closed circuit 1312 is located in the magnetic field generated by the magnetic element 1313 and communicates with the elastic conductor element 1311. The closed circuit 1312, after being powered on, cuts the magnetic field to generate an electromagnetic force. The electromagnetic force can overcome an elastic force of the elastic conductor element 1311, so that the movable assembly 132 pressed with the elastic conductor element 1311 moves up and down along the direction of the optical axis. At this moment, the photosensitive chip 12 assembled on the movable assembly 132 can move up and down with the movable assembly 132 along the direction of the optical axis of the lens component 11, and is configured to cooperate with the fixed lens component 11 to implement the automatic focusing function.

The electromagnetic force generated by enabling the closed circuit 1312 to cut the magnetic field can overcome the elastic force of the elastic conductor element 1311, and the movable assembly 132 connected with the elastic conductor element 1311 is driven when the electromagnetic force is greater than the elastic force of the elastic conductor element 1311. The control for the above electromagnetically driven structure is convenient, the displacement precision of the photosensitive chip 12 assembled on the movable assembly 132 is improved, and thus the focusing precision, the photographing effect as well as the overall lightness and thinness of the driving mechanism 13 are all improved.

The photosensitive chip 12 of the camera module 1 is assembled on the movable assembly 132, and the lens component 11 is assembled on the fixed assembly 133, so that the camera module 1 can be automatically focused via a movement of the photosensitive chip 12 of small size and weight, and the lens component 11 of large size and weight is fixed. Therefore, the power and size of the driving mechanism 13 are reduced, and the photographing effect and the overall lightness and thinness of the camera module 1 and the electronic device are improved.

It is to be noted that a direction of the electromagnetic force may be changed by controlling a direction of a current in the closed circuit 1312, thereby obtaining the electromagnetic forces in different directions. When the direction of the electromagnetic force is changed, the elastic forces in upper and lower directions can be overcome, thus implementing up and down movement of the movable assembly 132.

In the above embodiment, two magnetic elements 1313 and two closed circuits 1312 are provided. The two magnetic elements 1313 are respectively assembled at two opposite ends of the fixed assembly 133 to generate a magnetic field perpendicular to the direction of the optical axis of the lens component 11. The two closed circuits 1312 are both disposed in the magnetic field. An installation space in a central area of the fixed assembly 133 cannot be occupied by the magnetic elements 1313 which are disposed at two ends of the fixed assembly 133, and the space utilization rate is improved. Alternatively, multiple groups of magnetic elements 1313 and closed circuits 1312 may also be provided. The multiple groups of magnetic elements 1313 are disposed at any positions of the fixed assembly 133 and can be subjected to implementing magnetic field cutting in cooperation with the closed circuits 1312. The number and position of the magnetic element 1313 and the closed circuit 1312 are not limited in the present disclosure.

Figure 5:
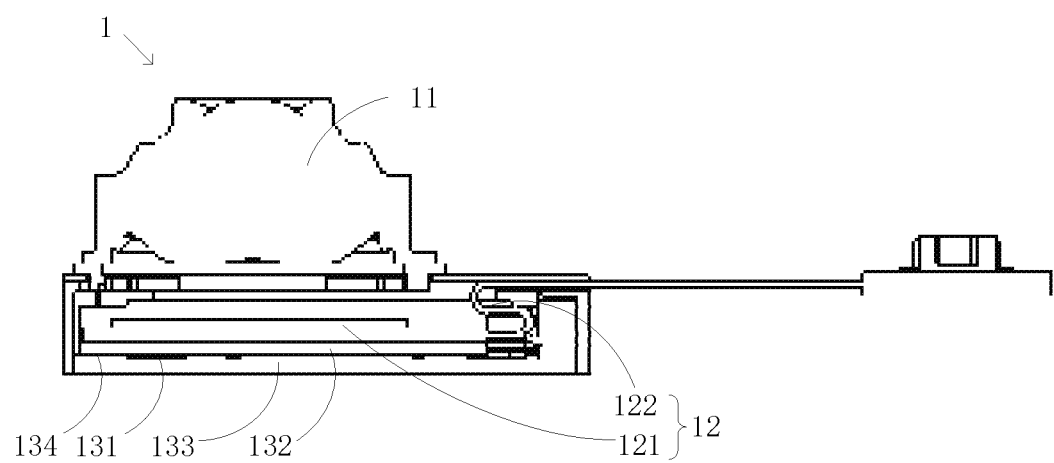
FIG. 5 is a sectional structural schematic diagram illustrating a camera module according to another exemplary embodiment of the present disclosure.

It is to be noted that the magnetic element 1313 may be a magnet, and may also be other objects capable of generating a magnetic field, which is not limited in the present disclosure. The closed circuit 1312 may be a coil electrically connected with the photosensitive chip 12 to obtain a current. Alternatively and/or additionally, the closed circuit 1312 may also be provided with a power supply independently, which is not limited in the present disclosure. For example, as illustrated in FIG. 5, the photosensitive chip 12 includes a photosensitive body 121 and a circuit board 122 connected with the photosensitive body 121. The coil is electrically connected with the circuit board 122 to obtain the current. A position of the photosensitive body 121 corresponds to a position of the lens component 11 to sense incident light. The circuit board 122 may be made of a flexible material. The stress of the circuit board 122 may be eliminated by using material selection and a bending process so as to prevent the movement of the photosensitive chip 12 from affecting the function of a flexible board.

In addition, as shown in FIG. 3, two elastic conductor elements 1311 may be provided. The two elastic conductor elements 1311 are provided at two opposite ends of the movable assembly 132, so that the stability is improved when the elastic conductor elements 1311 are abutted against the movable assembly 132, and the movable assembly 132 is prevented from being shaken and damages due to the electromagnetic force overcoming the elastic force in movement. In some embodiments, multiple elastic conductor elements 1311 may be provided for the driving component 131 to further improve the stability of the movable assembly 132 in movement, which is not limited in the present disclosure.

It is to be noted that the elastic conductor element 1311 may be a spring made of a metal material, so that the structure is simple and the structural strength is perfect. The elastic conductor element 1311 may also be made of other conductor materials with elasticity, which is not limited in the present disclosure.

Since the camera module 1 in an electronic device generally includes a precision component, the dust, sundries and the like may greatly affect the functions of the camera module 1 and the electronic device. Therefore, the sealing property of the camera module 1 is important to itself and to the electronic device. Hereinafter, the overall structure of the camera module 1 will be exemplarily described via embodiments.

Figure 6:
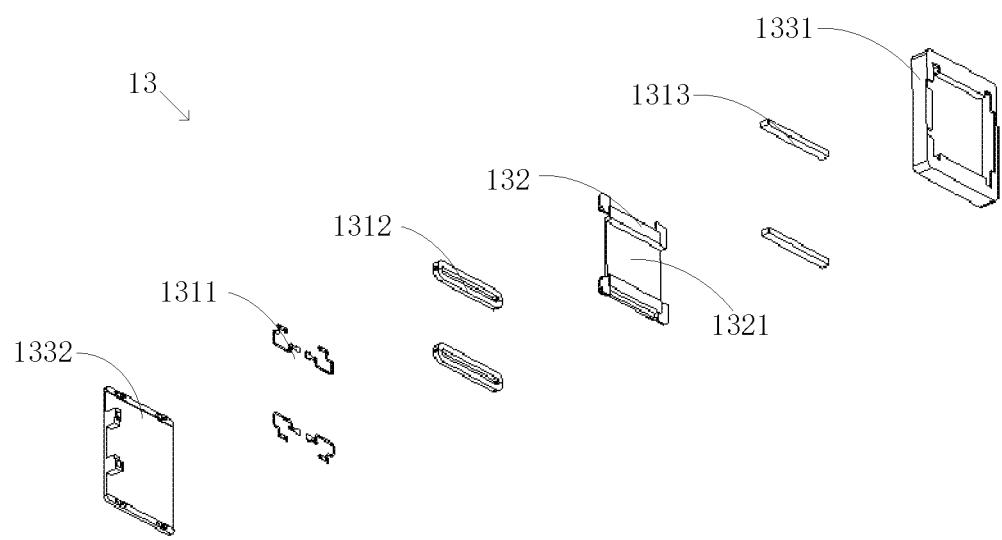
FIG. 6 is an exploded structural schematic diagram illustrating a driving mechanism according to an exemplary embodiment of the present disclosure.
Figure 7:
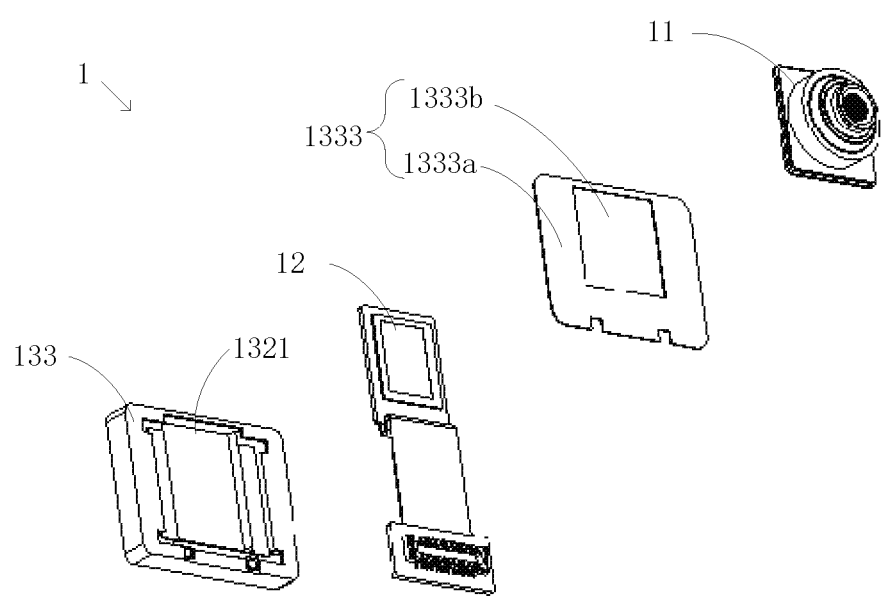
FIG. 7 is an exploded structural schematic diagram illustrating a camera module according to an exemplary embodiment of the present disclosure.

Also referring to FIGS. 6 and 7, the fixed assembly 133 includes a housing and a cover body 1333. The housing and the cover body 1333 cooperate in a sealing manner to define an assembly space, and the driving component 131 and the movable assembly 132 are disposed in the assembly space. For example, the movable assembly 132 is disposed in the housing, and is configured to cooperate with the housing to define an accommodating portion 134. The driving component 131 is assembled in the accommodating portion 134. The housing is directly taken as a fixed portion of the driving mechanism 13, and the movable assembly 132 is disposed in the housing, so that the aesthetics of the driving mechanism 13 is improved, and the overall thickness of the driving mechanism 13 is reduced. The driving component 131 is disposed in the accommodating portion 134 defined by the housing and the movable assembly 132, so that the encapsulation of the driving component 131 is achieved, and the interference of the sundries such as dust and the like to the driving component 131 is avoided. For example, when being driven by a magnetic force, the interference of the sundries such as dust and the like to the magnetic field and the electromagnetic induction effect can be avoided, and the control precision and the focusing precision of the electromagnetic force can be improved.

In the above embodiment, as illustrated in FIG. 6, the housing includes an upper casing 1331 and a base 1332 to facilitate the assembly of the driving mechanism 13 as well as the cooperation between the driving mechanism 13 and the photosensitive chip 12. For example, the magnetic element 1313 may be firstly assembled on a corresponding position of the upper casing 1331, and the closed circuit 1312 is assembled on the movable assembly 132. Then the elastic conductor element 1311 is fixedly connected with a metal part on the base 1332 in a fixed connection manner such as welding and the like, and the elastic conductor element 1311 is abutted against the movable assembly 132. The upper casing 1331 and the base 1332 are finally assembled to implement the overall installation of the driving mechanism 13.

Further, as illustrated in FIG. 7, the cover body 1333 includes a body portion 1333a and a hollow portion 1333b. The body portion 1333a is configured to cooperate with the housing in a sealing manner; and the hollow portion 1333b is configured to cooperate with the photosensitive body 121 of the photosensitive chip 12 in a sealing manner. The cover body 1333 is configured to increase the overall encapsulation effect of the driving mechanism 13. A sunken concave portion 1321 may further be arranged on the movable assembly 132. The concave portion 1321 is configured to bear the photosensitive body 121. When the photosensitive body 121 is assembled in the concave portion 1321, the thickness of the driving mechanism 13 is matched with the thickness of the photosensitive chip 12, and thus the overall thickness of the driving mechanism 13 is reduced.

In the above embodiment, the lens component 11 may be assembled outside the cover body 1333 and is configured to cooperate with the cover body 1333 in a sealing manner. The lens component 11 may be assembled outside the cover body 1333 via a binding agent such as a glue and the like, so that the sealing effect of the driving mechanism 13 is improved. After the lens component 11 is assembled outside the cover body 1333, only the lens component 11 is protruded outside the housing of the driving mechanism 13, so that the overall aesthetics of the camera module 1 is improved, and the overall thickness of the camera module 1 is reduced.

An electronic device is further provided in the present disclosure, which includes a device body and the camera module 1, and the camera module 1 is assembled on the device body.

The driving mechanism 13 is provided for the camera module 1 of the electronic device, the photosensitive chip 12 of the camera module 1 is assembled on the movable assembly 132, and the lens assembly 11 is assembled on the fixed assembly 133. The driving component 131 of the driving mechanism 13 is configured to cooperate with the movable assembly 132, so that the movable assembly 132 can be driven to move relative to the fixed assembly 133 by the driving mechanism 13. With the above structure, the camera module 1 can be automatically focused via a movement of the photosensitive chip 12 of small size and weight, and the lens component 11 of large size and weight is fixed. Therefore, the power and size of the driving mechanism 13 are reduced, and the photographing effect and the overall lightness and thinness of the camera module 1 and the electronic device are improved.

It is to be noted that the electronic device may be a mobile phone, a computer and the like, which is not limited in the present disclosure.

Other embodiments of the present disclosure will be apparent to those skilled in the art from consideration of the specification and practice of the present disclosure here. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A camera module, comprising:
  a driving mechanism including a driving component, a fixed assembly, and a movable assembly;
  a photosensitive chip assembled on the movable assembly; and
  a lens component assembled on the fixed assembly;
  wherein the driving component comprises an elastic conductor element, a closed circuit, and a magnetic element;
  wherein the closed circuit is located in a magnetic field generated by the magnetic element, and is configured to communicate with the elastic conductor element to generate an electromagnetic force for overcoming an elastic force of the elastic conductor element;
  wherein the elastic conductor element is fixedly connected with the fixed assembly, and is abutted against the movable assembly; and the elastic conductor element is configured to drive the movable assembly to move relative to the fixed assembly during a focusing function in response to determining that the electromagnetic force is greater than the elastic force of the elastic conductor element, wherein a direction of the electromagnetic force is changed by controlling a direction of a current in the closed circuit, thereby obtaining electromagnetic forces in different directions, and when the direction of the electromagnetic force is changed and the electromagnetic force is greater than the elastic force, the movable assembly moves up and down along a direction of an optical axis of the lens component;
  wherein the photosensitive chip assembled on the movable assembly moves up and down with the movable assembly along the direction of the optical axis of the lens component assembled on the fixed assembly, and is configured to cooperate with the lens component to implement an automatic focusing function; and the camera module is automatically focused via a movement of the photosensitive chip, and the lens component is fixed on the fixed assembly;
  wherein the fixed assembly comprises a housing and a cover body, the housing and the cover body are configured to cooperate in a sealing manner to define an assembly space, and the driving component and the movable assembly are disposed in the assembly space, wherein the movable assembly is configured to cooperate with at least one part of the housing to define an accommodating portion, and the driving component is assembled in the accommodating portion;

wherein the housing comprises an upper casing and a base, the magnetic element is assembled on a corresponding position of the upper casing, the closed circuit is assembled on the movable assembly, the elastic conductor element is fixedly connected with a metal part on the base in a fixed connection manner, and the upper casing and the base are assembled to implement an overall installation of the driving mechanism;

wherein the elastic conductor element is a spring made of a metal material.

2. The camera module of claim 1, wherein the cover body comprises a body portion configured to cooperate with the housing and a hollow portion corresponding to a photosensitive body of the photosensitive chip; and the lens component of the camera module is assembled outside the cover body, and is configured to cooperate with the hollow portion in a sealing manner.

3. The camera module of claim 1, wherein the magnetic element comprises two magnetic elements, and the two magnetic elements are assembled at two opposite ends of the fixed assembly.

4. The camera module of claim 1, wherein the elastic conductor element comprises two elastic conductor elements, and the two elastic conductor elements are provided at two opposite ends of the movable assembly.

5. The camera module of claim 1, wherein a concave portion is arranged on the movable assembly and is configured to bear a photosensitive body of the photosensitive chip, and when the photosensitive body is in the concave portion, a thickness of the driving mechanism is matched with a thickness of the photosensitive chip.

6. The camera module of claim 1, wherein the photosensitive chip comprises a photosensitive body and a circuit board connected with the photosensitive body, a position of the photosensitive body corresponds to a position of the lens component, and the closed circuit is electrically connected with the circuit board, wherein the circuit board is made of a flexible material.

7. An electronic device, comprising:
a device body; and
a camera module assembled on the device body;
wherein the camera module comprises: a driving mechanism, a photosensitive chip, and a lens component;
wherein the driving mechanism comprises: a driving component, a fixed assembly, and a movable assembly, the photosensitive chip being assembled on the movable assembly, the lens component being assembled on the fixed assembly;
wherein the driving component comprises an elastic conductor element, a closed circuit, and a magnetic element;
wherein the closed circuit is located in a magnetic field generated by the magnetic element, and is configured to communicate with the elastic conductor element to generate an electromagnetic force for overcoming an elastic force of the elastic conductor element;
wherein the elastic conductor element is fixedly connected with the fixed assembly, and is abutted against the movable assembly; and the elastic conductor element is configured to drive the movable assembly to move relative to the fixed assembly during a focusing function in response to determining that the electromagnetic force is greater than the elastic force of the elastic conductor element, wherein a direction of the electromagnetic force is changed by controlling a direction of a current in the closed circuit, thereby obtaining electromagnetic forces in different directions, and when the direction of the electromagnetic force is changed and the electromagnetic force is greater than the elastic force, the movable assembly moves up and down along a direction of an optical axis of the lens component;

wherein the photosensitive chip assembled on the movable assembly moves up and down with the movable assembly along the direction of the optical axis of the lens component assembled on the fixed assembly, and is configured to cooperate with the lens component to implement an automatic focusing function; and the camera module is automatically focused via a movement of the photosensitive chip, and the lens component is fixed on the fixed assembly;

wherein the fixed assembly comprises a housing and a cover body, the housing and the cover body are configured to cooperate in a sealing manner to define an assembly space, and the driving component and the movable assembly are disposed in the assembly space, wherein the movable assembly is configured to cooperate with at least one part of the housing to define an accommodating portion, and the driving component is assembled in the accommodating portion;

wherein the housing comprises an upper casing and a base, the magnetic element is assembled on a corresponding position of the upper casing, the closed circuit is assembled on the movable assembly, the elastic conductor element is fixedly connected with a metal part on the base in a fixed connection manner, and the upper casing and the base are assembled to implement an overall installation of the driving mechanism;

wherein the elastic conductor element is a spring made of a metal material.

8. The electronic device of claim 7, wherein the magnetic element comprises two magnetic elements, and the two magnetic elements are assembled at two opposite ends of the fixed assembly.

9. The electronic device of claim 7, wherein the elastic conductor element comprises two elastic conductor elements, and the two elastic conductor elements are provided at two opposite ends of the movable assembly.

10. The electronic device of claim 7, wherein the cover body comprises a body portion configured to cooperate with the housing and a hollow portion corresponding to a photosensitive body of the photosensitive chip; and the lens component of the camera module is assembled outside the cover body, and is configured to cooperate with the hollow portion in a sealing manner.

11. The electronic device of claim 7, wherein a concave portion is arranged on the movable assembly and is configured to bear a photosensitive body of the photosensitive chip, and when the photosensitive body is in the concave portion, a thickness of the driving mechanism is matched with a thickness of the photosensitive chip.

12. The electronic device of claim 7, wherein the photosensitive chip comprises a photosensitive body and a circuit board connected with the photosensitive body, a position of the photosensitive body corresponds to a position of the lens component, and the closed circuit is electrically connected with the circuit board, wherein the circuit board is made of a flexible material.

* * * * *